United States Patent
Goergen et al.

(10) Patent No.: US 11,200,738 B2
(45) Date of Patent: Dec. 14, 2021

(54) FOUR-DIMENSIONAL IMAGING SYSTEM FOR CARDIOVASCULAR DYNAMICS

(71) Applicant: Purdue Research Foundation, West Lafayette, IN (US)

(72) Inventors: Craig J Goergen, West Lafayette, IN (US); Frederick William Damen, Chicago, IL (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/903,039

(22) Filed: Jun. 16, 2020

(65) Prior Publication Data
US 2021/0248820 A1 Aug. 12, 2021

Related U.S. Application Data

(60) Provisional application No. 62/971,465, filed on Feb. 7, 2020.

(51) Int. Cl.
*G06T 17/20* (2006.01)
*G06T 15/08* (2011.01)
*G06T 19/20* (2011.01)

(52) U.S. Cl.
CPC ............ *G06T 17/205* (2013.01); *G06T 15/08* (2013.01); *G06T 19/20* (2013.01);
(Continued)

(58) Field of Classification Search
CPC ....... G06T 17/205; G06T 15/08; G06T 19/20; G06T 2200/24; G06T 2210/41; G06T 2219/2012; G06T 2219/2016
See application file for complete search history.

(56) References Cited

U.S. PATENT DOCUMENTS

| | | | |
|---|---|---|---|
| 2011/0200232 A1* | 8/2011 | Forthmann | G06T 7/246 382/107 |
| 2013/0002646 A1* | 1/2013 | Lin | G06T 7/11 345/419 |

(Continued)

OTHER PUBLICATIONS

Jegathese, C. Reginald, et al. "Cyber heart: the employment of an iterative design process to develop a left ventricular heart graphical display." Proceedings. 2003 International Conference on Cyberworlds. IEEE, 2003. (Year: 2003).*

(Continued)

*Primary Examiner* — Daniel F Hajnik
(74) *Attorney, Agent, or Firm* — Purdue Research Foundation

(57) ABSTRACT

A system may receive imaging data generated by an imaging device directed at a heart. The system may receive a first input operation indicative of a selected time-frame. The system may display images of the heart based on the intensity values mapped to the selected time-frame. The system may receive, based on interaction with the images, an apex coordinate and a base coordinate. The system may calculate, based on the apex coordinate and the base coordinate, a truncated ellipsoid representative an endocardial or epicardial boundary of the heart. The system may generate a four-dimensional mesh comprising three-dimensional vertices spaced along the mesh. The system may overlay, on the displayed images, markers representative of the vertices. The system may receive a second input operation corresponding to a selected marker. The system may enhance the mesh by adjusting or interpolating vertices across multiple time-frames.

17 Claims, 14 Drawing Sheets
(12 of 14 Drawing Sheet(s) Filed in Color)

(52) U.S. Cl.
CPC ...... *G06T 2200/24* (2013.01); *G06T 2210/41* (2013.01); *G06T 2219/2012* (2013.01); *G06T 2219/2016* (2013.01)

(56) References Cited

U.S. PATENT DOCUMENTS

| | | | |
|---|---|---|---|
| 2016/0063697 A1* | 3/2016 | Yokota | G06T 7/344 382/131 |
| 2018/0161009 A1* | 6/2018 | Waechter-Stehle | A61B 8/0883 |

OTHER PUBLICATIONS

Parisi, A. F., Moynihan, P. F., Feldman, C. L., & Folland, E. D. (1979). Approaches to determination of left ventricular volume and ejection fraction by real-time two-dimensional echocardiography. Clinical cardiology, 2(4), 257-263. https://doi.org/10.1002/clc.4960020404.

Bhan, A., Sirker, A., Zhang, J., Protti, A., Catibog, N., Driver, W., Botnar, R., Monaghan, M.J. & Shah, A.M. 2014 High-frequency speckle tracking echocardiography in the assessment of left ventricular function and remodeling after murine myocardial infarction. Am J Physiol Heart Circ Physiol 306, H1371-1383. (doi:10.1152/ajpheart.00553.2013).

Biere, L., Donal, E., Terrien, G., Kervio, G., Willoteaux, S., Furber, A. & Prunier, F. 2014 Longitudinal strain is a marker of microvascular obstruction and infarct size in patients with acute ST-segment elevation myocardial infarction. PLoS One 9, e86959. (doi:10.1371/journal.pone.0086959).

Bauer, M., Cheng, S., Jain, M., Ngoy, S., Theodoropoulos, C., Trujillo, A., Lin, F.C. & Liao, R. 2011 Echocardiographic speckle-tracking based strain imaging for rapid cardiovascular phenotyping in mice. Circ Res 108, 908-916. (doi:10.1161/CIRCRESAHA.110.239574).

Li, Y., Garson, C.D., Xu, Y., Helm, P.A., Hossack, J.A. & French, B.A. 2011 Serial ultrasound evaluation of ntramyocardial strain after reperfused myocardial infarction reveals that remote zone dyssynchrony develops in concert with left ventricular remodeling. Ultrasound Med Biol 37, 1073-1086. (doi:10.1016/j.ultrasmedbio.2011.04.002).

Torres, W.M., Jacobs, J., Doviak, H., Barlow, S.C., Zile, M.R., Shazly, T. & Spinale, F.G. 2018 Regional and temporal changes in left ventricular strain and stiffness in a porcine model of myocardial infarction. Am J Physiol Heart Circ Physiol 315, H958-H967. (doi:10.1152/ajpheart.00279.2018).

Soepriatna, A.H., Damen, F.W., Vlachos, P.P. & Goergen, C.J. 2018 Cardiac and respiratory-gated volumetric murine ultrasound. Int J Cardiovasc Imaging 34, 713-724. (doi:10.1007/s10554-017-1283-z).

Damen, F.W., Berman, A.G., Soepriatna, A.H., Ellis, J.M., Buttars, S.D., Aasa, K.L. & Goergen, C.J. 2017 High-Frequency 4-Dimensional Ultrasound (4DUS): A Reliable Method for Assessing Murine Cardiac Function. Tomography 3, 180-187. (doi:10.18383/j.tom.2017.00016).

Grune, J., Blumrich, A., Brix, S., Jeuthe, S., Drescher, C., Grune, T., Foryst-Ludwig, A., Messroghli, D., Kuebler, W.M., Ott, C., et al. 2018 Evaluation of a commercial multi-dimensional echocardiography technique for ventricular volumetry in small animals. Cardiovasc Ultrasound 16, 10. (doi:10.1186/s12947-018-0128-9).

Ahn, H.S., Kim, Y.K., Song, H.C., Choi, E.J., Kim, G.H., Cho, U.S., Ihm, S.H., Kim, H.Y., Park, C.S. & Youn, H.J. 2017 The impact of preload on 3-dimensional deformation parameters: principal strain, twist and torsion. Cardiovasc Ultrasound 15, 22. (doi:10.1186/s12947-017-0111-x).

Xia, J.Z., Xia, J.Y., Li, G., Ma, W.Y. & Wang, Q.Q. 2014 Left ventricular strain examination of different aged adults with 3D speckle tracking echocardiography. Echocardiography 31, 335-339. (doi:10.1111/echo.12367).

Boyle, J., Soepriatna, A., Damen, F., Rowe, R., Pless, R., Kovacs, A., Goergen, C., Thomopoulos, S. & Genin, G.M. 2018 Accurate and noise insensitive strain mapping enables ultrasound analysis of cardiac function in three dimensions. J Biomech Eng. (doi:10.1115/1.4041576).

Satriano, A., Heydari, B., Narous, M., Exner, D.V., Mikami, Y., Attwood, M.M., Tyberg, J.V., Lydell, C.P., Howarth, A.G., Fine, N.M., et al. 2017 Clinical feasibility and validation of 3D principal strain analysis from cine MRI: comparison to 2D strain by MRI and 3D speckle tracking echocardiography. Int J Cardiovasc Imaging 33, 1979-1992. (doi:10.1007/s10554-017- 1199-7).

Cerqueira, M.D., Weissman, N.J., Dilsizian, V., Jacobs, A.K., Kaul, S., Laskey, W.K., Pennell, D.J., Rumberger, J.A., Ryan, T., Verani, M.S., et al. 2002 Standardized myocardial segmentation and nomenclature for tomographic imaging of the heart. A statement for healthcare professionals from the Cardiac Imaging Committee of the Council on Clinical Cardiology of the American Heart Association. Circulation 105, 539-542. (doi:10.1161/hc0402.102975).

Hankiewicz, J.H., Goldspink, P.H., Buttrick, P.M. & Lewandowski, E.D. 2008 Principal strain changes precede ventricular wall thinning during transition to heart failure in a mouse.

Wu, V., Takeuchi, M., Otani, K., Haruki, N., Yoshitani, H., Tamura, M., HAbe, H., Lin, F., and Otsuji, Y., Effect of Through-Plane and Twisting Motion on Left Ventricular Strain Calculation: Direct Comparison between Two-Dimensional and Three-Dimensional Speckle-Tracking Echocardiography. J Am Soc Echocardiography vol. 26, No. 11, Nov. 2013. 1274-1281 e1274. (doi:10.1016/j.echo.2013.07.006).

Soepriatna, A.H., Yeh, A.K., Clifford, A.D., Bezci, S.E., O'Connell, G.D., Goergen, C.J., Three-dimensional myocardial strain correlates with murine left ventricular remodelling severity postinfarction. J.R. Soc. Interface 16: 20190570. Published Nov. 20, 2019. Available at http://dx.doi.org/10.1098/rsif.2019.0570.

Soepriatna, A.H., Boyle, J.J., Clifford, A.D., Yeh, A.K., Bezci, S.E., O'Connell, G.D., Goergen, C.J. 3D Strain Gradients Correlate with Murine Myocardian Infarct Severity. Summer Biomechanics, Bioengineering and Biotransport Conference (SB3C2019), Jun. 25-28, 2019, Seven Springs, PA, USA. Abstract published Jan. 22, 2019.

Damen, F., Costa, M., Goergen, C., Kinematic Analysis of Murine Cardiac Hypertrophy Using High-Frequency Four-Dimensonal Ultrasound. Presented Jun. 28, 2019 at the Summer Biomechanics, Bioengineering and Biotransport Conference (SB3C2019 Conference slides), Seven Springs, PA.

Damen, F.W., Gramling, D.P., Goergen, C.J., Spatiotemporal Strain Mapping of Cardiac Hypertrophy Using Four-Dimensional Ultrasound. Summer Biomechanics, Bioengineering and Biotransport Conference (SB3C2020), June 17-20, Vail, CO, USA. Abstract published Jan. 16, 2020.

\* cited by examiner

FIG. 6

FOUR-DIMENSIONAL IMAGING SYSTEM FOR CARDIOVASCULAR DYNAMICS

CROSS REFERENCE TO RELATED APPLICATIONS

This application claims the benefit of U.S. Provisional Application No. 62/971,465 filed Feb. 7, 2020, which is hereby incorporated by reference in its entirety.

TECHNICAL FIELD

This disclosure relates to medical imaging and, in particular, to cardiovascular medical imaging.

BACKGROUND

Congestive heart failure is a common sequela of myocardial infarction (MI), cardiac hypertrophy, and other pathologies associated with adverse remodeling. Despite clear diagnostic criteria of late-stage heart failure, the mechanical factors that drive cardiac early-stage remodeling remains unclear. The majority of ultrasound studies, however, still rely on 2D approaches to quantify global reductions of left ventricular (LV) function.

BRIEF DESCRIPTION OF THE DRAWINGS

The patent or application file contains at least one drawing executed in color. Copies of this patent or patent application with color drawings(s) will be provided by the Office upon request and payment of the necessary fee.

The embodiments may be better understood with reference to the following drawings and description. The components in the figures are not necessarily to scale. Moreover, in the figures, like-referenced numerals designate corresponding parts throughout the different views.

FIG. 6 illustrates a fourth example of a graphical user interface with an identified base location;

DETAILED DESCRIPTION

Figure 1:
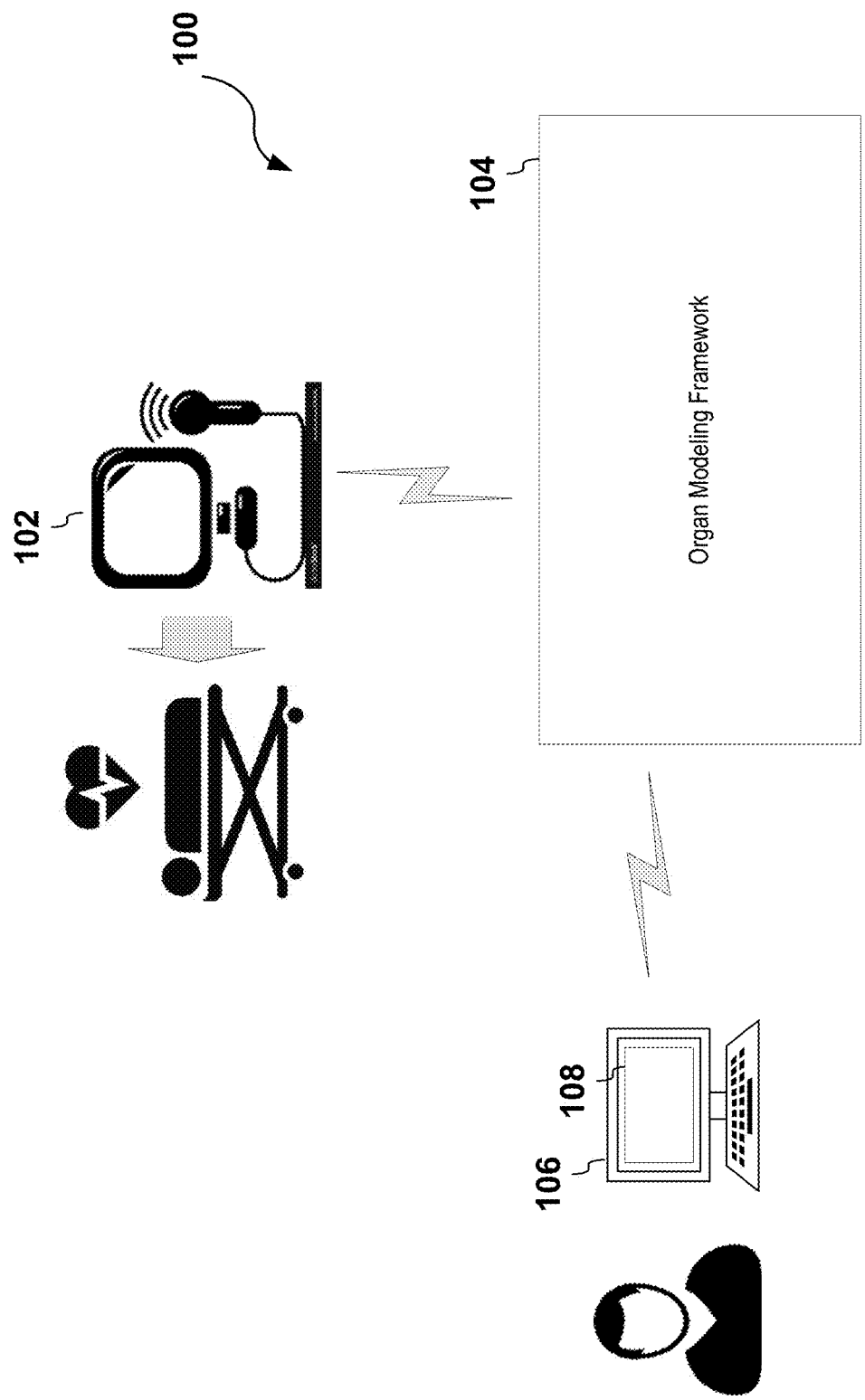
FIG. 1 illustrates a first example of a system 100 for imaging organ dynamics.

System and methods for four-dimensional imaging for organ dynamics are provided. By way of introductory example, the system may receive imaging data generated by an imaging device directed at a heart. The imaging data may include intensity values in three spatial dimensions and time-frame identifiers associated with the intensity values. The time-frame identifiers may identify frames sampled over a time window of a cardiac cycle. The system may receive a first input operation indicative of a selected time-frame. The system may display images of the heart, or a portion thereof, based on the intensity values mapped to the selected time-frame. The system may receive, based on interaction with the images, an apex coordinate and a base coordinate for the selected time-frame, the apex coordinate representative of the apex of the left-ventricle and the base coordinate representative of the base of the left-ventricle. The system may calculate, based on the apex coordinate and the base coordinate, a truncated ellipsoid representative an endocardial or epicardial boundary of the heart. The system may generate a four-dimensional mesh comprising a plurality of three-dimensional vertices mapped to a time-frame value corresponding selected time-frame, the three-dimensional vertices spaced along the truncated ellipsoid. The system may overlay, on the displayed images, a plurality of adjustable markers representative of the vertices that are mapped with the selected time-frame. The system may receive a second input operation corresponding to a selected marker. The system may enhance the mesh by adjusting or interpolating vertices across multiple time-frames.

A technical advancement provided in the system and methods described herein is a framework for quantifying regional kinematics across the entire left-ventricle, which incorporates motion of the left-ventricular base and apex throughout the cardiac cycle in output boundary meshes. This approach corrects for through-plane motion inherent to planar imaging of tissue with substantial gross movement, such as the left-ventricle of the heart. Although conventional short-axis motion-mode (SAXMM) ultrasound and cine magnetic resonance imaging (MRI) are two of the most prevalent strategies used for quantifying cardiac function, there are few notable limitations including imprecision, inaccuracy, and geometric assumptions with ultrasound, or large and costly systems with substantial infrastructure requirements with MRI. 4-dimensional ultrasound provides comparable information to cine MRI through spatiotemporally synced imaging of cardiac motion, while reducing user variability associated with traditional ultrasound approaches.

Another example of a technical advancement provided by the system and methods described herein is the ability to integrate 4-dimensional ultrasound with three-dimensional strain mapping to longitudinally characterize LV mechanics. The ability to quantify regional strain is particularly useful when assessing remodeling due to myocardial infarction or pathological hypertrophy. Additional or alternative technical advancements are made evident by the system and methods described herein.

FIG. 1 illustrates a first example of a system 100. The system may include an imaging device 102 suited for diagnostic imaging. The imaging device 102 may include, for example, a device that generates imagery with ultrasound, magnetic resonance imaging, and/or computed tomography. The imaging device 102 may generate imaging data. The imaging data may include a matrix of intensity values where each intensity value is mapped to a physical location in space (x, y, z). In some examples, the imaging data may be four-dimensional with three spacial dimensions and a temporal dimension (t).

The system 100 may include an organ modeling framework 104 to model organs that move dynamically with cardiorespiratory rhythms. As described in various examples herein, the organ may include the heart, or a portion of the heart such as the left ventricle. By way of non-limiting example, the organ or portions of organ may include the thoracic aorta, abdominal aorta, abdominal organs, carotid arteries, etc. The modeling framework 104 may receive imaging data and generate a model of the organ. The model may include a mesh of points defining the morphology of the organ at multiple points across the time-domain.

The modeling framework 104 may communicate with a terminal 106 to generate a graphical user interface 108. A user may interact with the user interface 108 to provide various inputs for modeling the organ. The modeling framework 104 may provide various controls to enable generation and enhancement of a model (or models).

In some examples, the model may represent the epicardial and/or endocardial barriers of the of a left ventricle of a heart.

Figure 2:
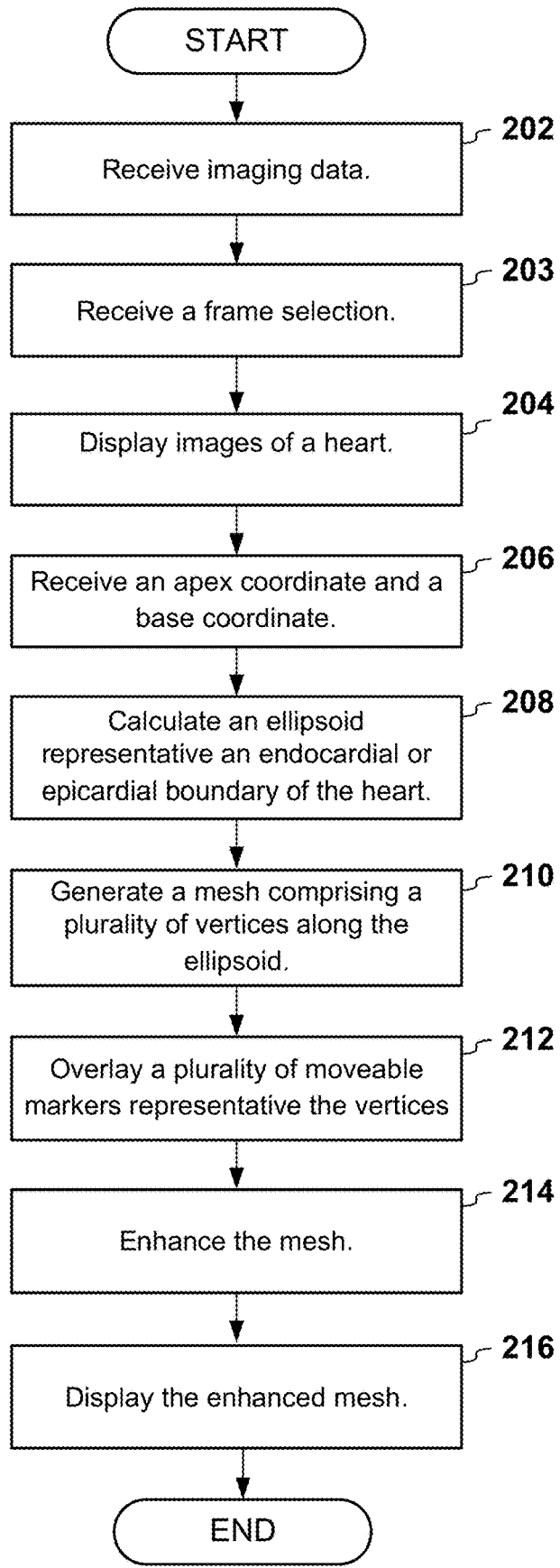
FIG. 2 illustrates a flow diagram of left ventricle imaging providing by the system.

FIG. 2 illustrates a flow diagram of left ventricle imaging providing by the system 100. Reference to FIG. 1 and FIG. 2 are made throughout the remaining description.

The modeling framework 104 may receive imaging data (202). For example, the imaging data may be received in real-time from the imaging device 102. Alternatively, the imaging data may be previously generated and accessed from stored memory or a network location.

In some examples, the imaging device 102 may send intensity values representative of pixels, which are pre-processed and stored in a 4D data structure with three special dimensions and one temporal dimension.

The modeling framework 104 may receive a selected time-frame (203). The modeling framework 104 may cause images of a heart to be displayed (204). For example, the images of the heart that are displayed may be generated based on imaging data associated with the selected time-frame.

Figure 3:
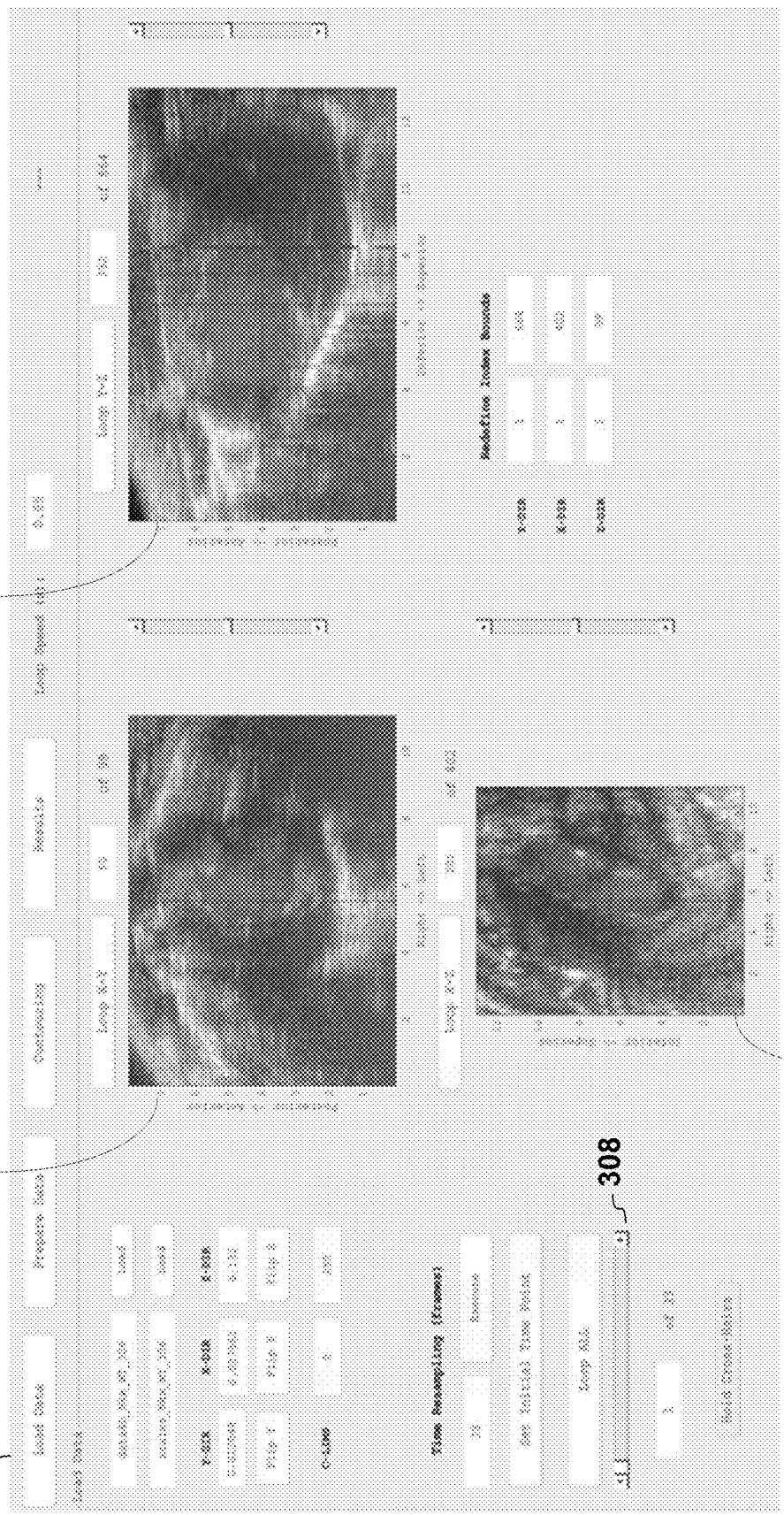
FIG. 3 illustrates a first example of a graphical user interface

FIG. 3 illustrates an example of the graphical user interface 108. Images 302-306 are displayed by separating imaging data into orthogonal planes. The graphical user interface may include a first image 302 rendered to view a first cross section of the imaging data (x-y plane). A second image 304 rendered to view a second cross section of the imaging data orthogonal to the first cross section (x-z plane). A third image 306 may be rendered to view a third cross section orthogonal to the first and second cross section (x-z plane).

The user interface may have a time-frame selection control 308. The time-frame selection control may detect or respond to user input. In response to interaction with the time-frame selection control 308, the modeling framework 104 may receive a time-frame selection. The time-frame selection may identify one or more time-frames sampled from the imaging data.

Relative spacing between pixels is determined using the physical dimensions of each axis inputted. All three views may be synchronized to show the same relative time-frame.

FIG. 4-8 illustrates various examples of the graphical user interface 108 involved in pre-processing the imaging data for modeling. The modeling system may provide the user interfaces to assist with the pre-processing.

After receiving the imaging data, the imaging data may be digitally resampled to an isotropic voxel resolution (i.e. all voxels have equal dimensions). In various examples, the modeling framework 104 may receive a rotate command corresponding to an isolated axis. The rotate command may correspond to an input operation with controls 402 respectively associated with the isolated axis. In response to the rotate command, the modeling framework may rotate spatial locations by which intensity values of the inputted data is sampled to align the base and apex of the left ventricle along the z-axis. Then, the modeling framework 104 may transform the four-dimensional data corresponding to the image based on the rotations. Accordingly, the imaging may be rotated to standardize alignment. For example, to ensure the z-axis goes through the apex of the heart and approximate center of the base of the heart, the image data may be re-oriented to coordinate axes oblique to the input axes. The cross-sectional locations (z-axis) of the base and apex of the heart are tracked through time (t-axis).

Figure 4:
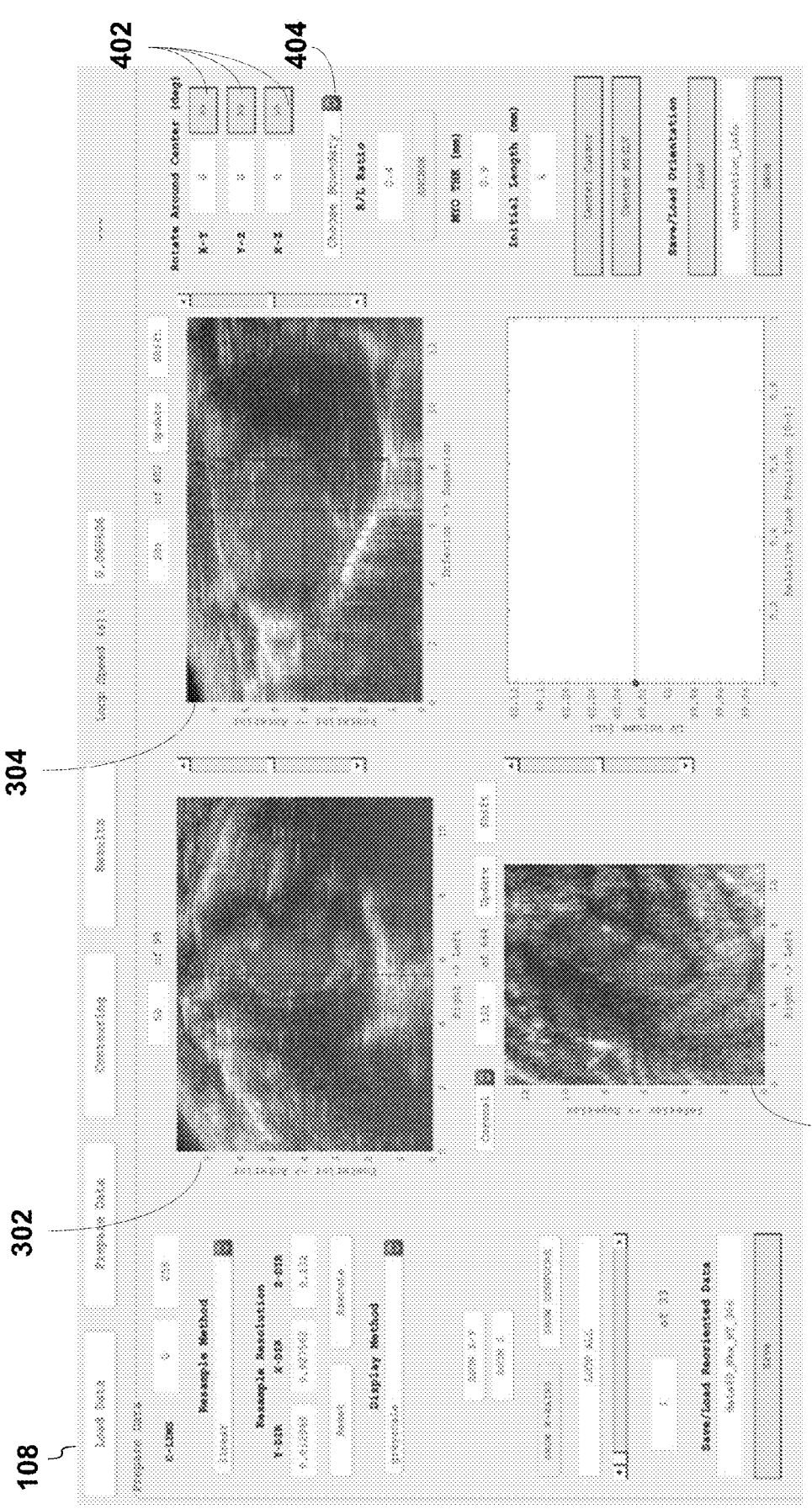
FIG. 4 illustrates a second example of a graphical user interface for pre-processing imaging data.

Referring to FIG. 4, data may be reoriented around a marker (such as a crosshair or the like). The graphical user interface 108 may provide one or more controls to change the location of the crosshairs in the image(s). In some examples, the graphical user interface 108 may respond to touch operations (i.e. on the display of the terminal) detected by the terminal 106 and/or modeling framework 104. The crosshairs and/or displayed images may move in response to the detected operations.

Figure 5:
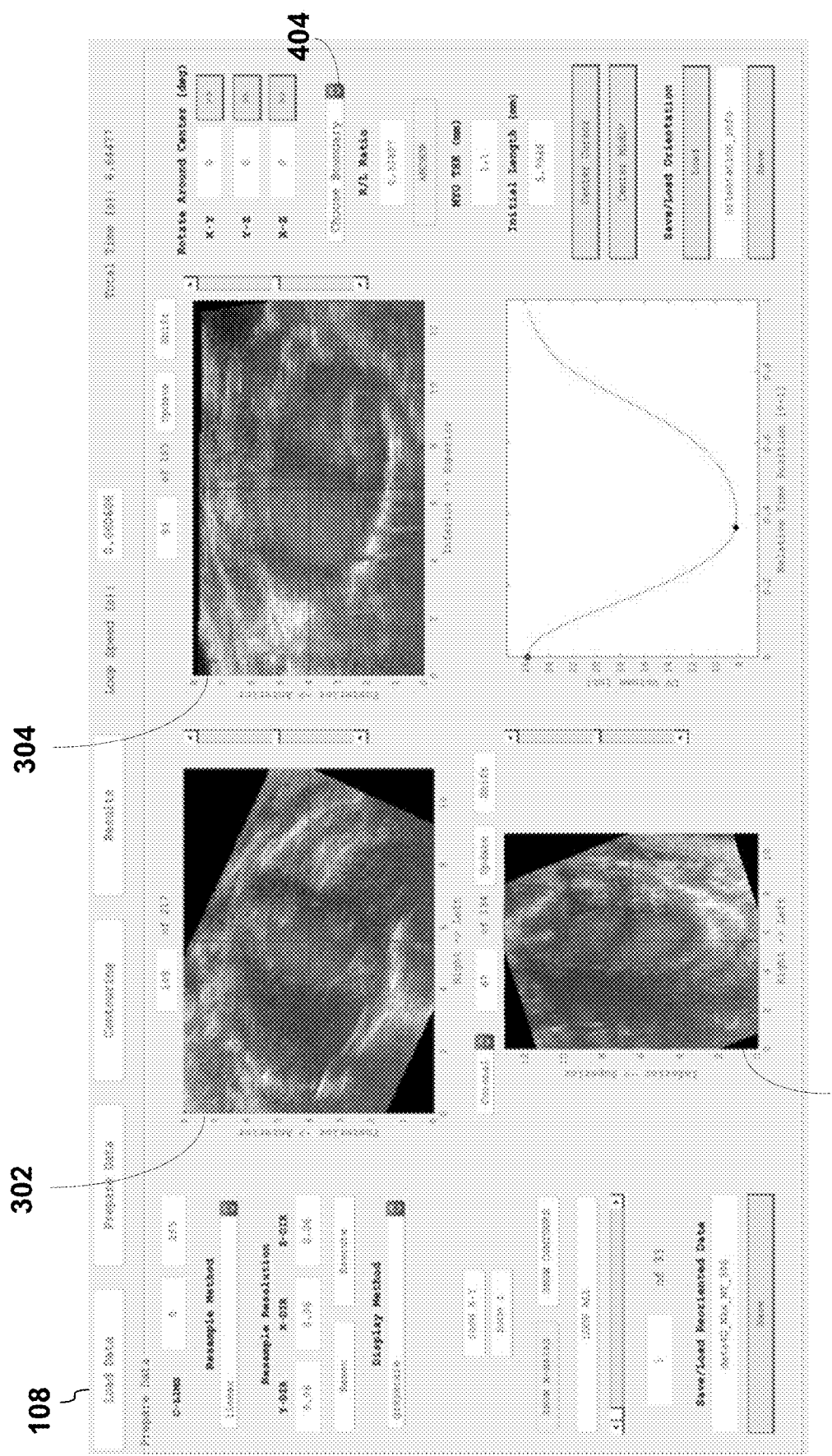
FIG. 5 illustrates a third example of a graphical user interface with rotated imaging data.

Referring to FIG. 4, a user may cause rotation via an input operation and/or by specifying axis-specific degrees of rotation. The modeling framework 104 may calculate the appropriate transformation matrix (either due to translation or rotation) to apply to the imaging data sample point locations, and then finally draws from that transformed (i.e. re-oriented) grid of physical locations to sample a new or updated imaging dataset using trilinear interpolation, as shown in FIG. 5.

To form an initial model, the modeling framework 104 may receive initial input data, which is used to approximate the endocardial and epicardial boundaries of a heart or a portion thereof. For example, in the case of a left ventricle, the input data may include an apex coordinate and a base coordinate (206). The apex coordinate may identify a specified location of the apex of a left ventricle and the base may identify a specified location of the base of the left ventricle.

In some examples, the apex coordinates may be specified by selecting an input mode. For example, the user interface may include a boundary selection control (404). The boundary selection control 404 may be modified to select "base" or "apex".

Figure 6:
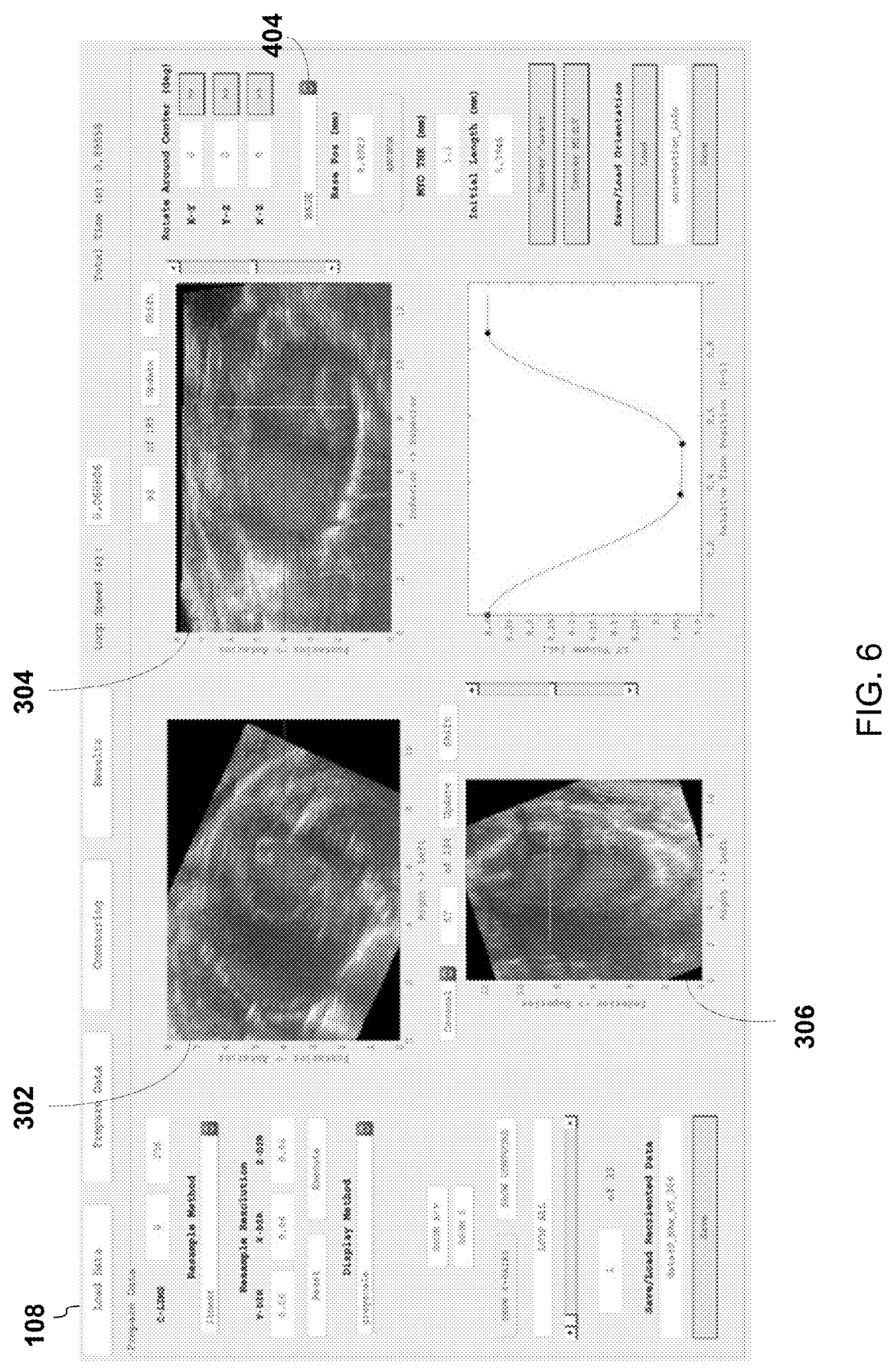
Figure 7:
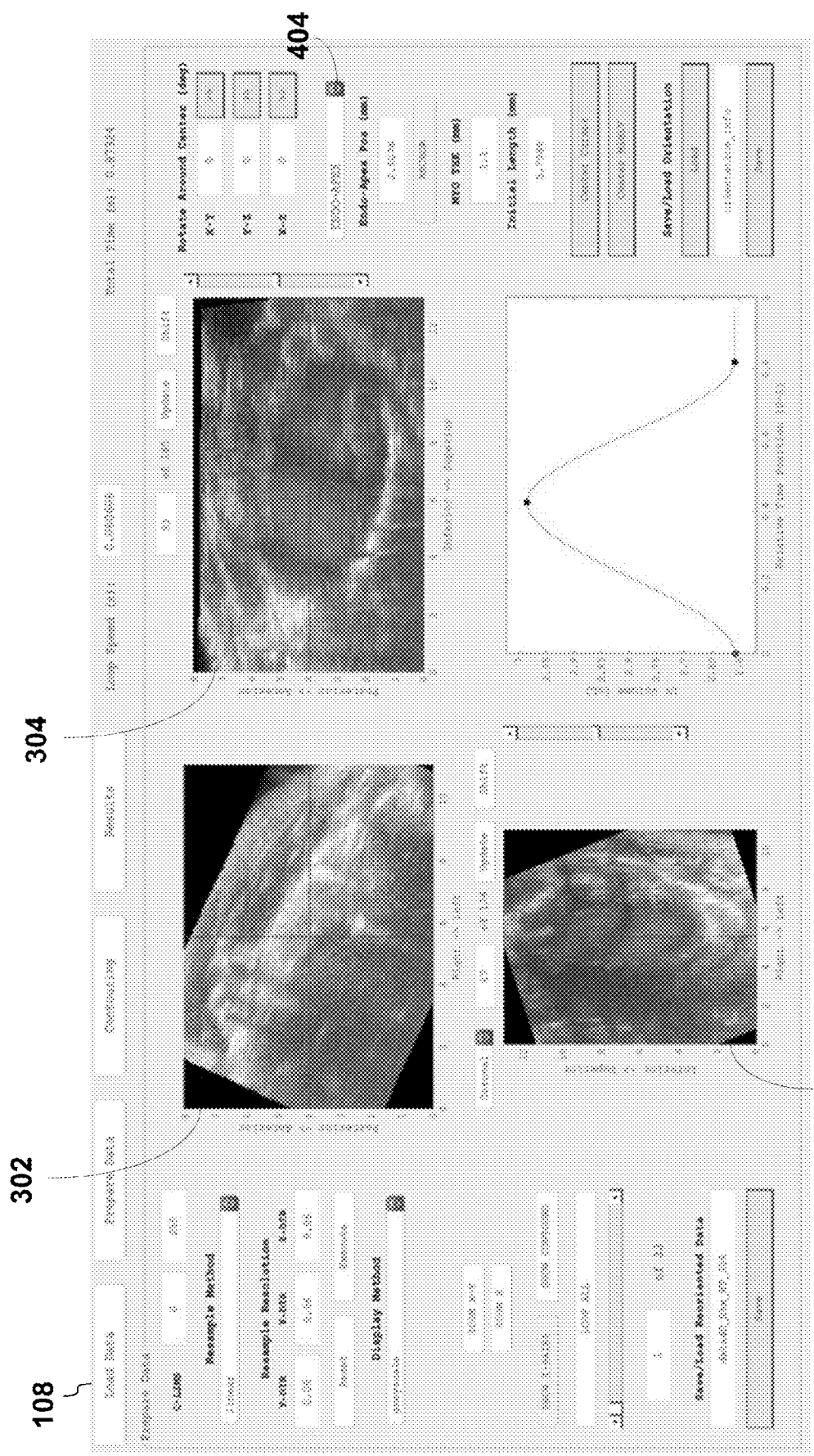
FIG. 7 illustrates a fifth example of a graphical user interface with an identified apex location.

As illustrated in FIG. 6-7, respective border positions (base/apex) are tracked by having the user define known locations throughout a representative cardiac cycle (black dots shown in FIGS. 6-7). The framework will interpolate the remaining positions, ensuring the curve returns to its initial position. By tracking these boundaries, the framework accounts for through-plane motion often not accounted for in other analysis strategies.

Figure 8:
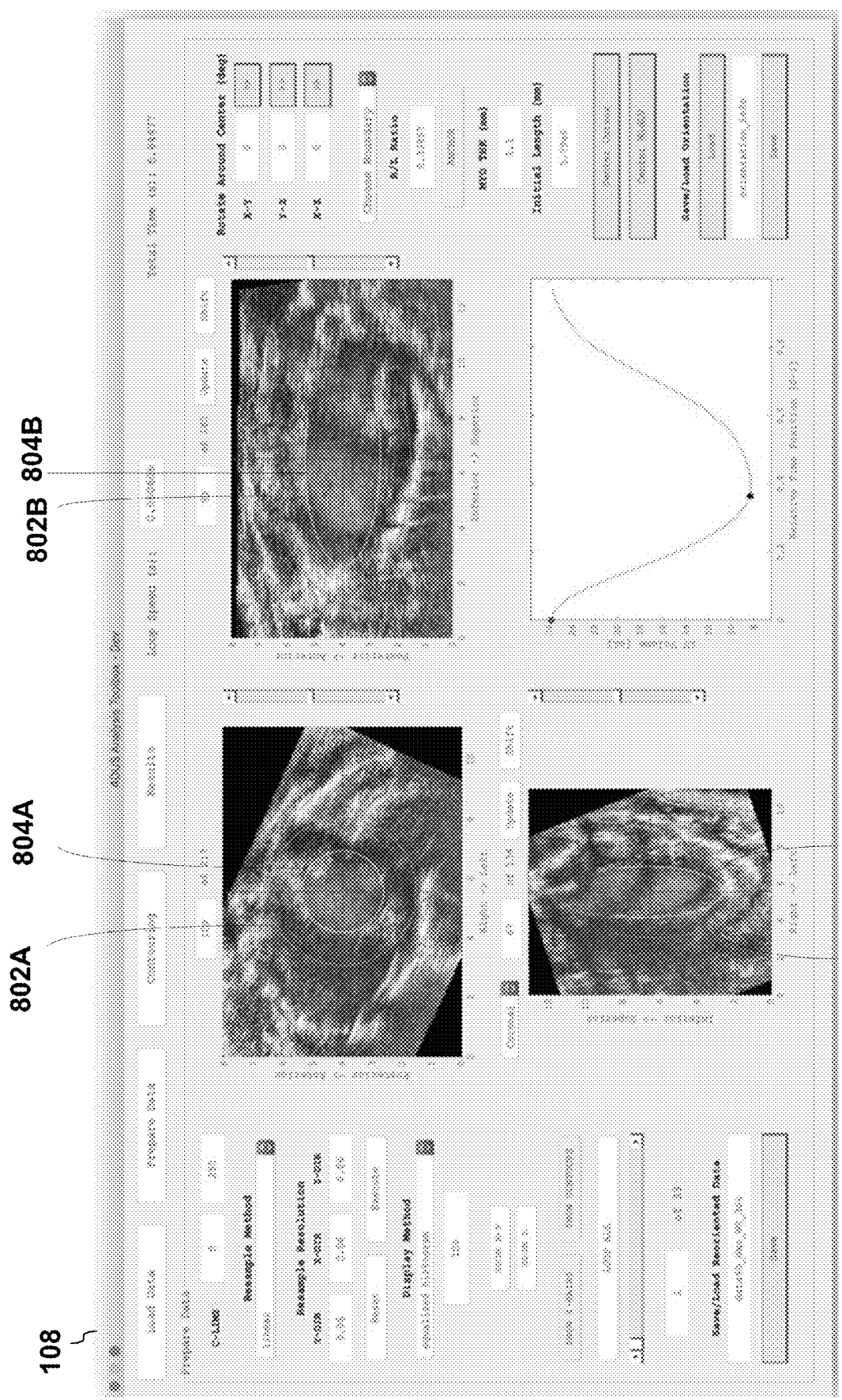
FIG. 8 illustrates a sixth example of a graphical user interface with a super-imposed boundary at a first time-frame.
Figure 9:
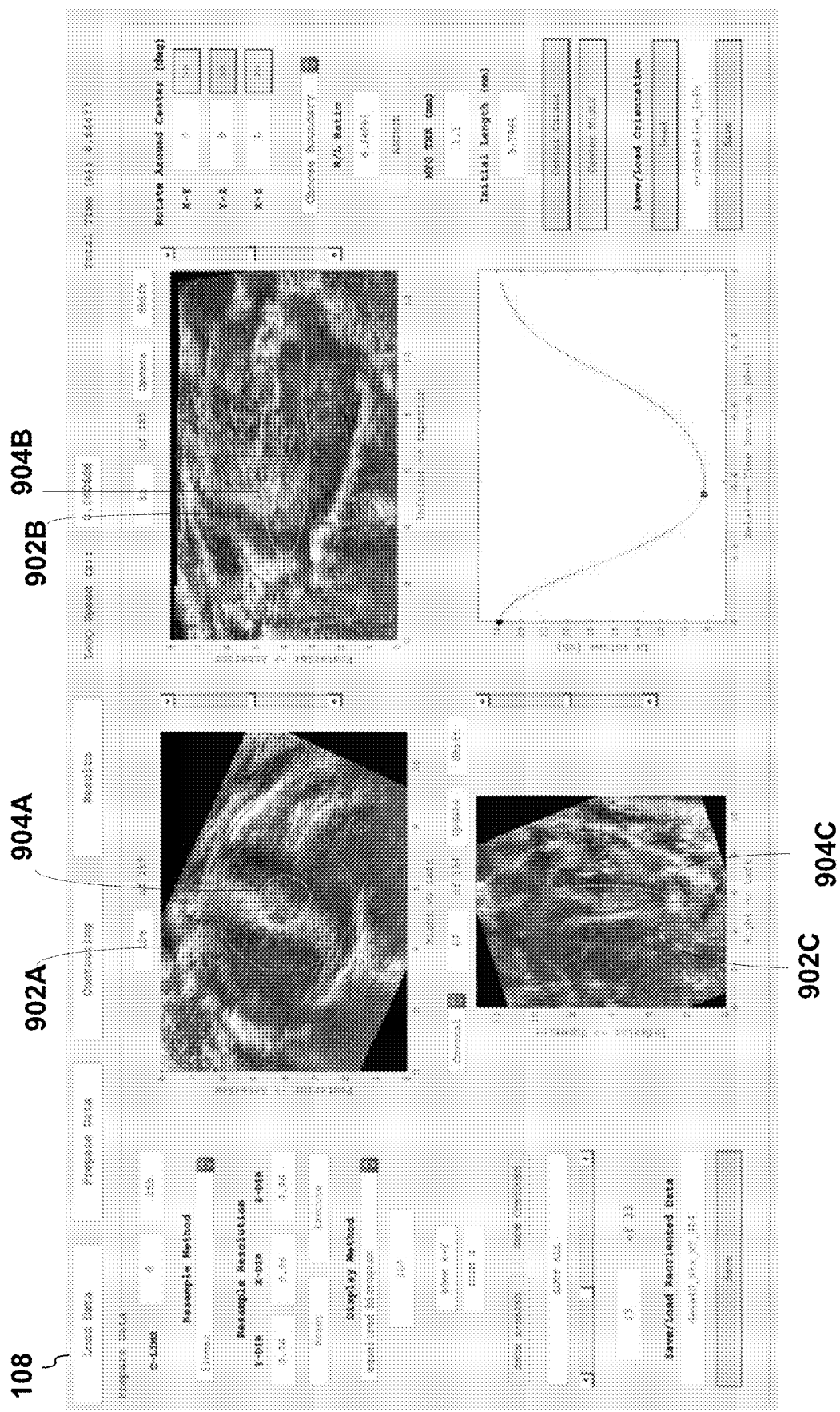
FIG. 9 illustrates a seventh example of a graphical user interface with a super-imposed boundary at a second time-frame.

The modeling framework 104 may calculate a truncated ellipsoid representative an endocardial or epicardial boundary of the heart (208). Referring to FIGS. 8-9, a truncated ellipsoid is created at each time point across a representative cardiac cycle. The ellipsoid is created with its center along the z-axis at 70% of the distance from the cardiac apex to the base. Similar to tracking the base and apex, the ratio between the width and length of the ellipsoid may then be modified to account for circumferential wall movement throughout the cardiac cycle. From the final set of time-dependent ellipsoid volumes, initial estimations of global cardiac metrics are calculated (i.e. ejection fraction, stroke volume, etc.). As seen in the last two images, image histogram equalization can be applied to increase local contrast and aid the user in defining landmarks.

FIG. 8 illustrates the truncated ellipsoid overlay for a single time-frame. Cross-section markers 802A-C of a first truncated ellipsoid, representative of the epicardial boundary, may be super-imposed on the image for a specified time-frame. Similarly, cross-section markers 804A-C of a second truncated ellipsoid, representative of the endocardial boundary, may be superimposed on the images for a specified time-frame.

The positioning of the truncated ellipsoids may be determined based on the aforementioned base and apex locations, and ratio of ellipsoid width to length, using the following equations and an array of samples along the z-axis:

$$\text{radii} = (\text{length} \cdot \text{ratio}_{\text{radius/length}}) \sqrt{1 - \left(\frac{z}{\text{length}}\right)^2} \quad \text{(eq. 1)}$$

$$\text{length} = (z_{base} - z_{apex}) \cdot 0.7 \quad \text{(eq. 2)}$$

As illustrated in FIG. 9, positioning of truncated ellipsoids may be recalculated and repositioned at specific time-frames using the graphical user interface. For example, cross-section markers 902A-C of a repositioned truncated ellipsoid representative of the epicardial boundary may be super-imposed on the image for a secondary time-frame. Similarly, cross-section markers 904A-C of a repositioned truncated ellipsoid representative of the endocardial boundary may be superimposed on the images for the corresponding secondary time-frame.

The modeling framework 104 may generate a mesh comprising a plurality of vertices along the ellipsoid (210). In some examples, the mesh may include a four-dimensional mesh where the vertices include sampled points along the ellipsoids at various times.

The myocardium dynamics framework and/or the graphical user interface platform may overlay a plurality of moveable markers representative of a subset of vertices intended to track the tissue borders (212).

Figure 10:
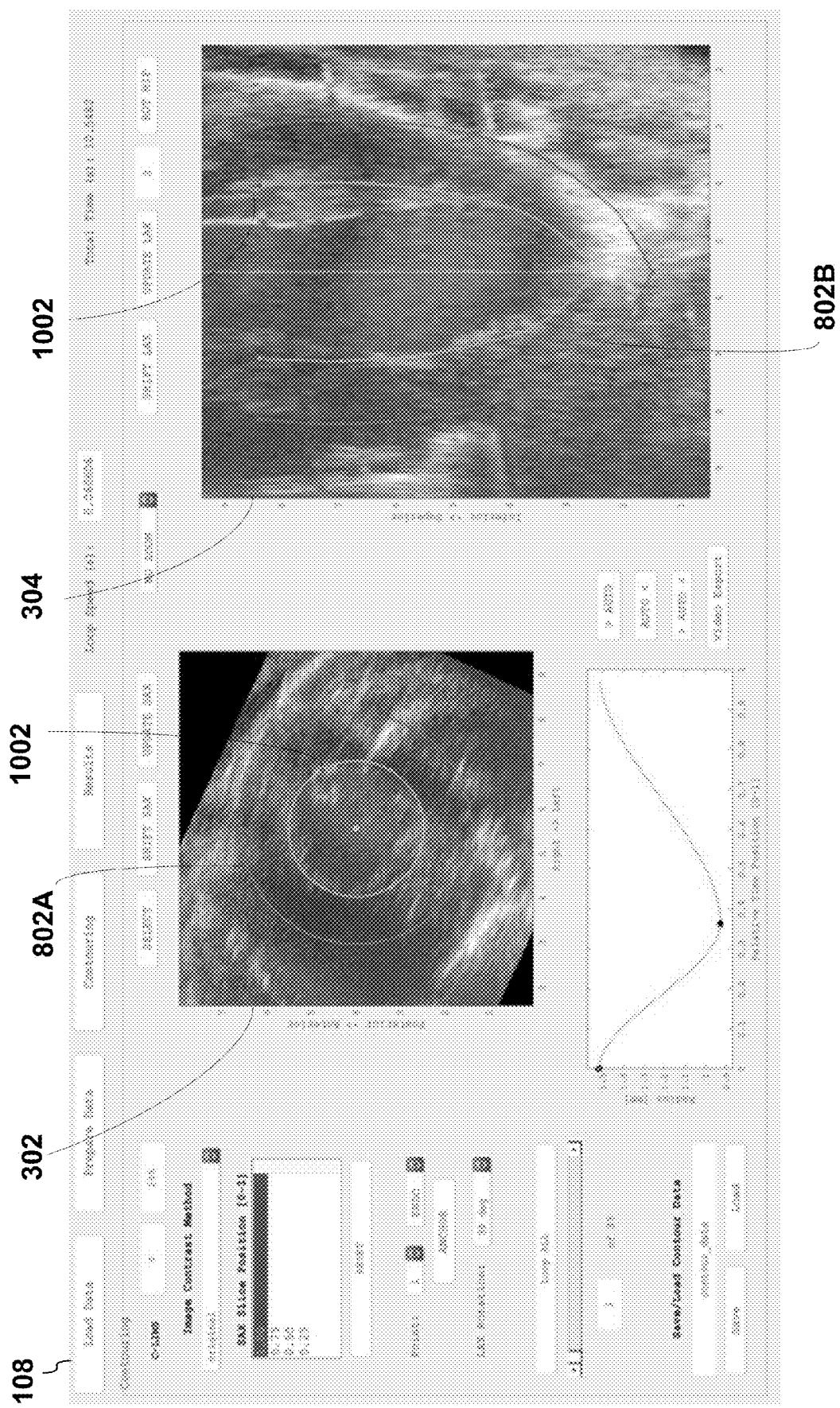
FIG. 10 illustrates an eighth example of a graphical user interface with a movable marker.
Figure 11:
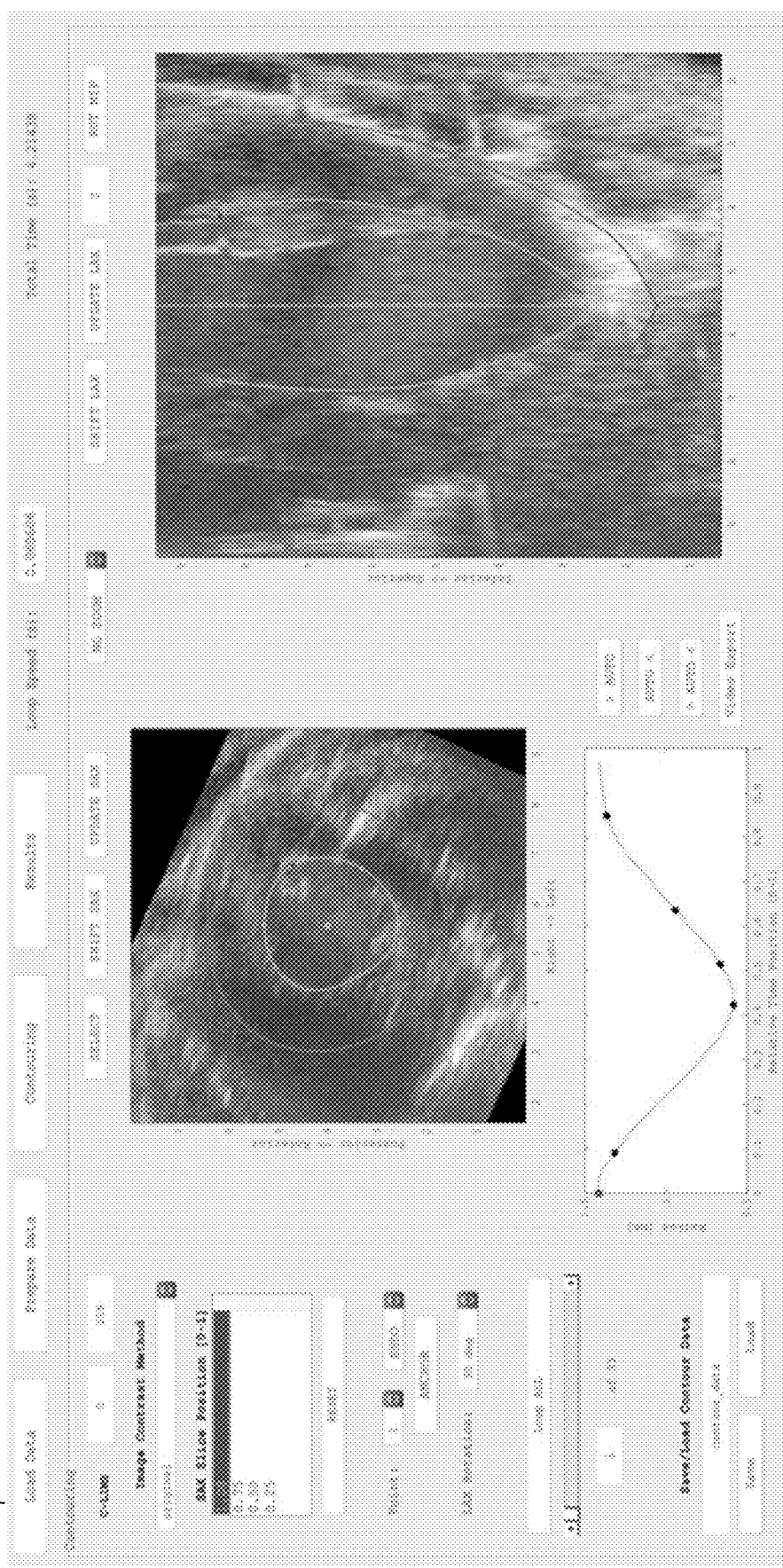
FIG. 11 illustrates a ninth example of a graphical user interface with a super-imposed boundary after contouring.

FIGS. 10-11 illustrate an example of the graphical user interface 108 for contouring 4D mesh data. The mesh may initial include equally spaced points around (short-axis view) and down (long-axis view) the z-axis. The mesh may be enhanced through adjustment, interpolation, and/or other measurements derived from interaction with the graphical user interface (204).

For example, a vertex of the mesh may be displayed using a marker 1002. The marker may be selected and/or movable to adjust the contours of the mesh at a specified time. The marker 1002 may become highlighted (i.e. embolden or changed color) to specify selection. In response to movement of the marker 1002, the shape (i.e. visible lines) of the cross section(s) 802(A-B) may change in one or more of the images. Accordingly, the controls of the left ventricle may be tracked and adjusted across the cardiac cycle by adjustment of the markers, as shown in FIG. 11. The tracked makers may include 24 points per boundary (i.e. 6 rotations around [30, 90, 150, 210, 270, 330 deg] the z-axis and 4 parallel slices equally spaced from the apex to base). Similar to tracking the base and apex locations, the user 1) selects an individual point based on rotation and slice, 2) defines known locations of that point (black dots) throughout the cardiac cycle (i.e. distances from the z-axis (yellow line)), and 3) the computer interpolates a curve of positions for that point.

The images on which boundaries are tracked are sliced from the oriented data, using the previously defined slice locations. For example, the set of short-axis slices corresponding to the base will follow the z-axis locations of the base defined in the prior tab. This ensures that potential errors due to through-plane motion are minimized during boundary mesh calculations.

In some examples, the endocardial or epicardial boundary may be interpolated. For example, additional points for corresponding times may be created by fitting hobby-splines through the 24-point sub-grid that was modified in the "Contouring" tab. Then from those hobby-splines, an equally spaced grid of points across the boundary (e.g. 60×60; around x down) is calculated.

Figure 12:
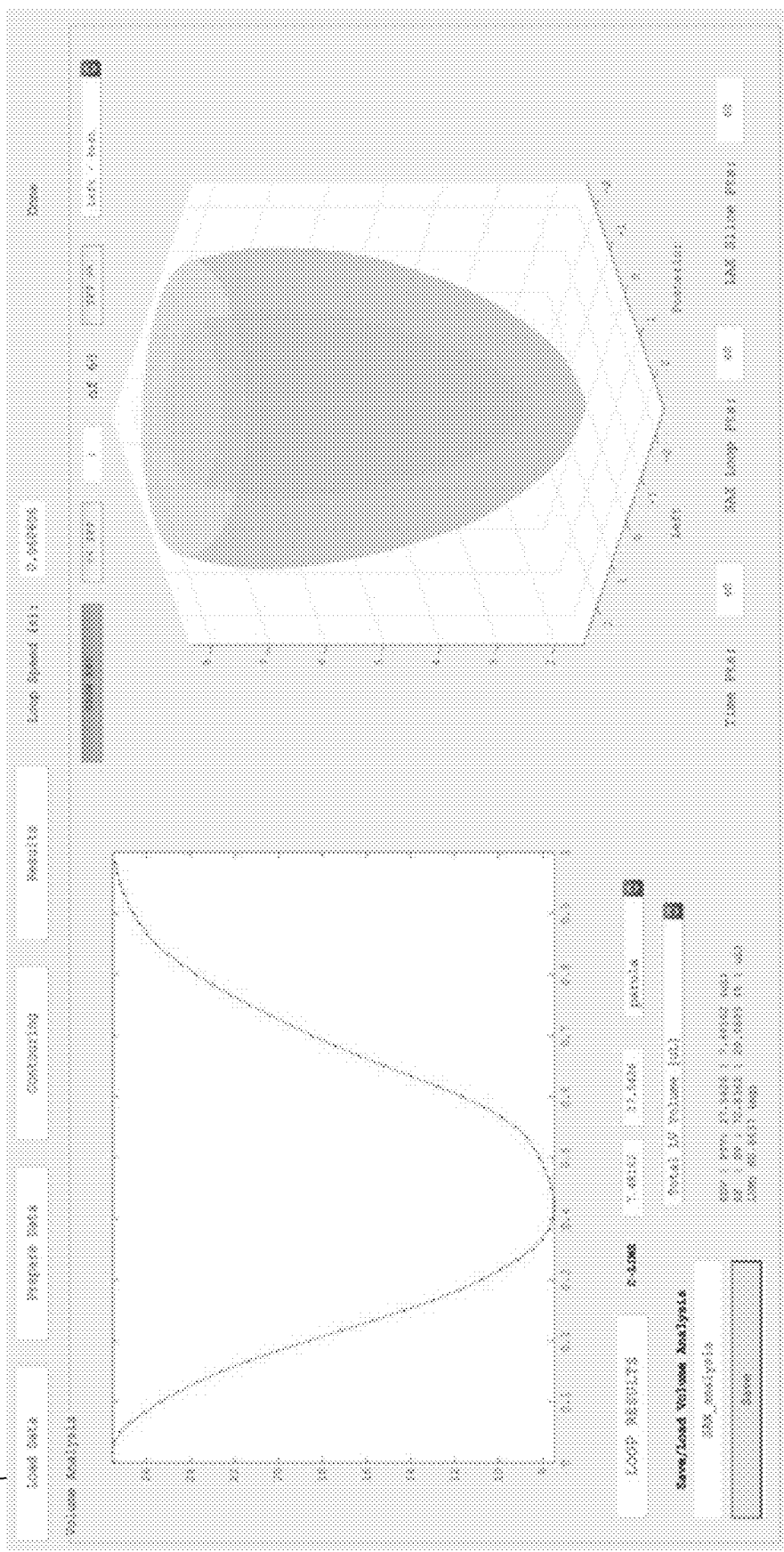
FIG. 12 illustrates a tenth example of a graphical user interface with an example plot of ventricular volume throughout a representative cardiac cycle.
Figure 13:
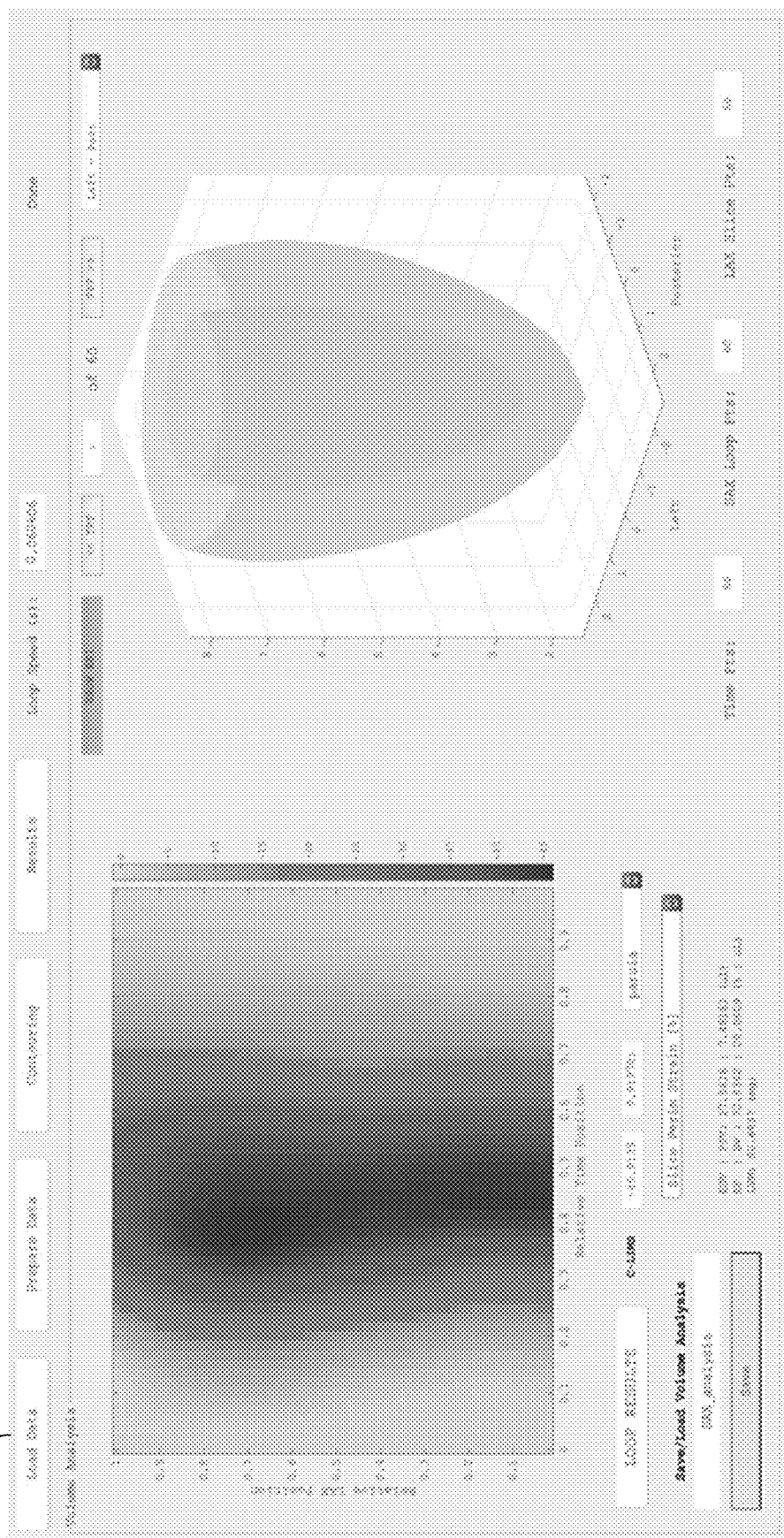
FIG. 13 illustrates an example of a spatiotemporal map of circumferential strain across the cardiac cycle based on the endocardial border kinematics.

The modeling framework 104 may display, or cause display of, the enhanced mesh. FIGS. 12-13 illustrate an example of the graphical user interface 108 displaying a first enhanced mesh for an endocardial boundary and a second enhanced mesh for an epicardial boundary.

FIG. 12 illustrates an example plot of ventricular volume throughout a representative cardiac cycle. Changes in physical location (x, y, z) of each point in that standardized grid provide the basis for calculating metrics of heart kinematics. For example, the user interface 108 in FIG. 12 illustrates circumferential strain represented by the percent change in endocardial boundary perimeter for every z-position down the 4D grid across the cardiac cycle. Three-dimensional renderings on the right-side of the GUI are created using Delaunay Triangulation between adjacent points and every triangular face can be colored according to the quantitative value that position represents.

In some examples, the modeling framework 104 may quantify various metrics of kinematics within the left ventricle across the cardiac cycle. For example, the modeling framework 104 may calculate, based on the endocardial and epicardial meshes, a regional metric of boundary kinematics and/or a global metric of cardiac function. The regional metric of boundary kinematics may include, for example, circumferential strain, longitudinal strain, radial strain, degrees of rotation, the principal component of Green-Lagrange strain, or a combination thereof. The global metric of cardiac function may include, for example, ejection fraction, cardiac output, stroke volume, left ventricular mass, or a combination thereof.

FIG. 13 illustrates an example of a spatiotemporal map of circumferential strain across the cardiac cycle based on the endocardial and epicardial boundaries. The modeling framework 104 may measure displacement of vertices between different time-frames over a playback period. The modeling framework 104 may determine color values based on the calculated value of circumferential strain at that location in space and time. For example, a color value may be associated with a range and a color value may be selected in response to the measured change being within the range. The modeling framework 104 may generate an an animation to illustrate circumferential strain representative by the color values over the playback period.

Figure 14:
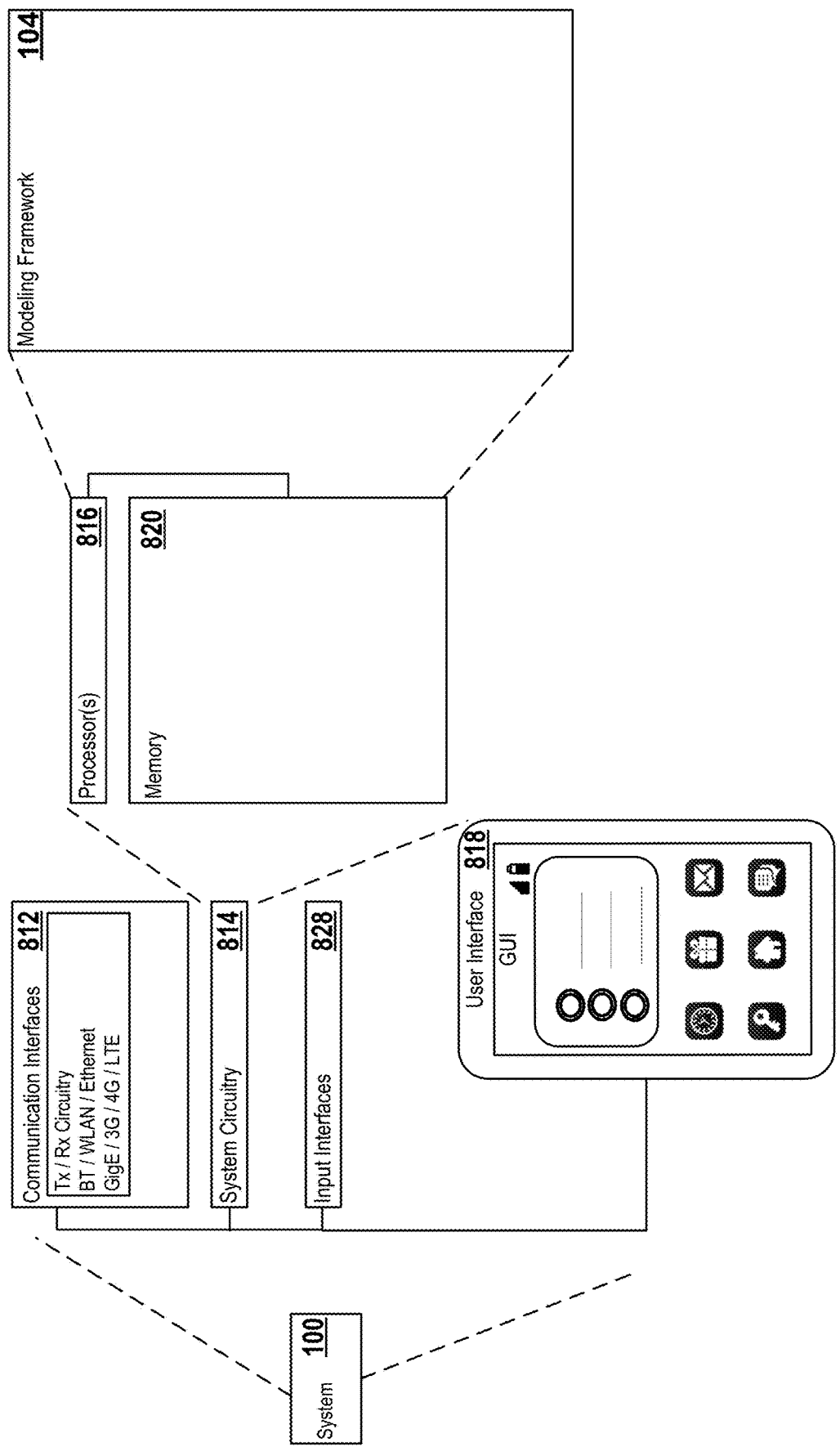
FIG. 14 illustrates a second example of the system 100.

FIG. 14 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the left ventricle modeling framework 104 and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the modeling framework 104 and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many ways. In some examples, the system 100 may be implemented with one or more logical components. For example, the logical components of the system 100 may be hardware or a combination of hardware and software. The logical components may include the modeling framework 104 or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts, or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. While various embodiments have been described, it will be apparent to those of ordinary skill in the art that many more embodiments and implementations are possible. Accordingly, the embodiments described herein are examples, not the only possible embodiments and implementations.

What is claimed is:

1. A method, comprising:
   receiving imaging data generated by an imaging device directed at a heart, the imaging data comprising intensity values in three spatial dimensions;
   generating at least three images representative of orthogonal cross-sections through the imaging data, respectively;
   generating an axis marker on each respective image, indicative of a location where respective planes for the other two image cross orthogonally;
   displaying the images of the heart, or a portion thereof;
   receiving a rotate command corresponding to an isolated axis;
   rotating at least one of the images to align the base and apex of the left ventricle along a z-axis;
   transforming the imaging data based on the rotation;
   receiving, based on interaction with the images, an apex coordinate and a base coordinate, the apex coordinate representative of the apex of the heart and the base coordinate representative of the base of the heart;
   calculating, based on the apex coordinate and the base coordinate, a truncated ellipsoid representative an endocardial or epicardial boundary of the heart;
   generating a mesh, the mesh comprising a plurality of vertices along the truncated ellipsoid;
   overlaying, on the displayed images, a plurality of moveable markers representative of the vertices;
   receiving an input operation corresponding to a selected one of the markers; and
   enhancing the mesh by adjusting, based on the input operation, a vertex of the mesh corresponding to the selected one of the markers.

2. The method of claim 1, further comprising:
   displaying a three-dimensional render of the heart based on the mesh.

3. The method of claim 2, wherein the mesh comprises a four dimensional mesh comprising spatial data mapped to time-frame identifiers, wherein displaying the three-dimensional render of the heart based on the mesh further comprises:
   generating an animation of the heart based on the changes in the spatial data over a plurality of frames in a time window.

4. The method of claim 2, wherein displaying the three-dimensional render of the heart based on the mesh further comprises:
   measuring changes of location between corresponding vertices at different time-frames over a playback period;
   determining a plurality of color values based on the measured changes of location; and
   generating an animation to illustrate circumferential strain representative by the color values over the playback period.

5. The method of claim 1, further comprising:
   calculating, based on the mesh, regional metrics of boundary kinematics and global metrics of cardiac function,
      the regional metrics of boundary kinematics comprising circumferential strain, longitudinal strain, radial strain, degrees of rotation, the principal component of Green-Lagrange strain, or a combination thereof, and
      the global metrics of cardiac function comprising ejection fraction, cardiac output, stroke volume, left ventricular mass, or a combination thereof; and
   displaying the regional metrics of boundary kinematics and global metrics of cardiac function.

6. The method of claim 1, wherein the truncated ellipsoid corresponds to the endocardial boundary of the heart, and the mesh is an initial instance of the mesh, the method further comprising:
   calculating, based on the apex coordinate and the base coordinate, a second truncated ellipsoid representative the epicardial boundary of the heart;
   generating a second four-dimensional mesh, the second mesh comprising a plurality of vertices along the second ellipsoid, the second vertices mapped to corresponding time-frame identifiers; and overlaying, on the displayed images, a plurality of moveable markers representative the vertices.

7. The method of claim 1, wherein the adjusted vertex is associated with a first time-frame, wherein enhancing the mesh further comprises:
interpolating, based on the adjusted vertex, a second vertex in a second time-frame,
including the second vertex in the mesh, wherein the mesh is a 4D mesh that respectively maps the first vertex to the first time-frame and the second vertex to the second time-frame.

8. A system comprising:
a processor, the processor configured to:
receive imaging data over a cardiac cycle, the imaging data generated by an imaging device directed at a heart, the imaging data comprising intensity values in three spatial dimensions;
display images of the heart, or a portion thereof, based on the imaging data;
receive, based on interaction with the images, an apex coordinate and a base coordinate, the apex coordinate representative of the apex of the heart and the base coordinate representative of the base of the heart;
calculate, based on the apex coordinate and the base coordinate, a first truncated ellipsoid representative of the endocardial of the heart and a second truncated ellipsoid representative of the epicardial boundary of the heart;
generate a first mesh and a second mesh, the first mesh comprising a plurality of vertices along the first truncated ellipsoid and the second mesh comprising a plurality of vertices along a second truncated ellipsoid, the vertices of the first mesh and the vertices of the second mesh mapped to corresponding time-frame identifiers representative of respective time samples in the cardiac cycle;
overlay, on the displayed images, a plurality of moveable markers comprising markers representative of the vertices of the first mesh and markers representative of the vertices of the second mesh;
receive an input operation corresponding to a selected one of the movable markers; and
adjust a vertex corresponding to the selected one of the markers.

9. The system of claim 8, wherein the processor is further configured to:
cause display of a three-dimensional render of the heart based on the mesh vertices.

10. The system of claim 9, wherein displaying the three-dimensional render of the heart based on the mesh further comprises:
generating an animation of the heart based on the changes in the spatial data over the cardiac cycle.

11. The system of claim 9, wherein to cause display of the three-dimensional render of the heart based on the mesh, the processor is further configured to:
measure changes of location between corresponding vertices at different times over a playback period;
determine a plurality of color values based on the measured changes of location; and
cause display an animation illustrative of changes of location represented by the color values over the playback period.

12. The system of claim 8, wherein the processor is further configured to:
calculate, based on the mesh, a regional metric of boundary kinematics and a global metric of cardiac function, the regional metric of boundary kinematics comprising circumferential strain, longitudinal strain, radial strain, degrees of rotation, the principal component of Green-Lagrange strain, or a combination thereof, and
the global metric of cardiac function comprising ejection fraction, cardiac output, stroke volume, left ventricular mass, or a combination thereof; and
cause display of the regional metric of boundary kinematics and global metric of cardiac function.

13. The system of claim 8, wherein to enhance the mesh, the processor is further configured to:
interpolate, based on the adjusted vertex, a second vertex; and
include the second vertex and the second time value in the mesh, wherein the mesh is a 4D mesh that respectively maps the first vertex to a first time-frame and the second vertex to a second time-frame.

14. The system of claim 8, wherein to cause display of the images of the heart based on the imaging data, the processor is further configured to:
generate three images representative of orthogonal cross-sections through the imaging data; and
generate an axis marker on each respective image indicative of a location where respective planes for the other two image cross orthogonally.

15. The system of claim 14, wherein the processor is further configured to:
receive a rotate command corresponding to an isolated axis;
rotate the spatial locations by which intensity values of the inputted data is sampled to align the base and apex of the left ventricle along an axis; and
transform the imaging data based on the rotation.

16. A method, comprising:
receiving imaging data generated by an imaging device directed at a heart, the imaging data comprising intensity values in three spatial dimensions and time-frame values associated with the intensity values, the time-frame values identifying sample frames within a time window of a cardiac cycle;
receive a first input operation indicative of a selected time-frame;
displaying images of the heart, or a portion thereof, based on the intensity values mapped to the selected time-frame;
receiving, based on interaction with the images, an apex coordinate and a base coordinate for the selected time-frame, the apex coordinate representative of the apex of the heart and the base coordinate representative of the base of the heart;
calculating, based on the apex coordinate and the base coordinate, a truncated ellipsoid representative an endocardial or epicardial boundary of the heart;
generating a four-dimensional mesh comprising a plurality of three-dimensional vertices mapped to a time-frame value corresponding selected time-frame, the three-dimensional vertices spaced along the truncated ellipsoid;
overlaying, on the displayed images, a plurality of adjustable markers representative of the vertices that are mapped with the selected time-frame;
receiving a second input operation corresponding to a selected marker; and
adjusting, based on the second input operation, a vertex of the mesh corresponding to the selected one of the markers and the selected time-frame.

17. The method of claim 16, further comprising:
    display a three-dimensional render of the heart based on the mesh.

* * * * *